United States Patent
El-Kik et al.

(10) Patent No.: US 6,999,581 B1
(45) Date of Patent: Feb. 14, 2006

(54) EVENT DETECTION CIRCUIT

(75) Inventors: Tony El-Kik, Allentown, PA (US);
Keith E. Hollenbach, Kutztown, PA (US); Donald R. Laturell, Allentown, PA (US); Steven B. Witmer, Sinking Spring, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/192,654

(22) Filed: Nov. 16, 1998

(51) Int. Cl.
*H04M 3/00* (2006.01)

(52) U.S. Cl. .................. 379/382; 379/377; 379/372; 379/399.01; 379/399.02

(58) Field of Classification Search ............ 379/90.01, 379/93.01, 372, 26.01, 93.05, 252, 413.02, 379/413.03, 413.04, 399.01, 399.02, 377, 379/382
See application file for complete search history.

(56) References Cited

U.S. PATENT DOCUMENTS

| | | | | |
|---|---|---|---|---|
| 4,066,848 A | * | 1/1978 | Darwood | ............... 379/373.01 |
| 4,645,874 A | * | 2/1987 | Fildes | |
| 5,864,607 A | * | 1/1999 | Rosen et al. | |
| 6,266,348 B1 | * | 7/2001 | Gross et al. | |
| 6,289,070 B1 | * | 9/2001 | Krone et al. | |
| 6,298,133 B1 | * | 10/2001 | Hein et al. | |
| 6,480,602 B1 | * | 11/2002 | Dupuis et al. | ......... 379/413.01 |
| 6,535,583 B1 | * | 3/2003 | Bobick et al. | ........... 379/88.07 |

\* cited by examiner

*Primary Examiner*—Jefferey F. Harold

(57) ABSTRACT

A network interface circuit that screens out transient signals and provides an indication to the line side that an actual event has occurred, so that appropriate discrimination circuitry is powered up to determine the exact nature of the actual event only when actually needed. The present invention develops an AC signal that represents the events that are desired to be detected. This AC signal is timed so that it has a sustained rate (e.g., a 1 millisecond burst) that is unlike any transient that would occur on the line. Thus, unless the incoming signal meets the timing requirements of the circuit, it is disregarded as a being a transient and no action is taken to determine the exact nature of the signal. This avoids the need to invoke the discrimination circuits that have large power requirements until they are actually needed.

13 Claims, 4 Drawing Sheets

EVENT DETECTION CIRCUIT

CROSS-REFERENCE TO RELATED APPLICATIONS

This application is related to an application entitled "Combination Clock and Charge Pump for Line Powered DAA" and an application entitled "Line Interface Circuit with Event Detection Signaling", both of which are assigned to the assignee of the present invention and both of which were filed concurrently with this application.

FIELD OF THE INVENTION

This invention relates generally to the field of telecommunications networks, and more particularly, to a network interface circuit that determines whether a signal on a TIP and RING line represents an actual event (e.g., a ring signal) or a transient noise signal (e.g., noise generated on the line as a result of a lightning strike).

BACKGROUND OF THE INVENTION

Telephone networks comprise a series of interconnected subsystems that are linked together at points called interfaces. These interfaces provide a link between old and new equipment and allow for simplified design and maintenance. A local loop is an example of an interface that connects a subscriber's telephone set and the central office.

The U.S. Federal Communications Commission (FCC) and counterpart regulatory agencies in other countries require, among other things, electrical isolation between the line side and the user devices on the user side. Electrical isolation protects the line side from damage transmitted from the device side and vice versa.

The isolation between the line side and the device side is often accomplished within the interface circuit. A modem is an example of an interface circuit that may include circuitry that provides electrical isolation from the line in addition to the signal modulation and demodulation function of the modem. Isolation transformers, optical coupling, and capacitive coupling are all examples of known methods of isolating the line side from the device side.

It is known to include in the interface circuit a discrimination circuit to identify the occurrence of signals is indicative of specific "events" that occur on the telephone line and discriminate between the different signals to determine what the particular event signifies.

FIG. 1 is a block diagram of a typical telecommunication system 5 showing the connection between a subscriber and a central office that controls the telecommunication system. Central-office equipment 10 on the line side 15 of the telecommunication system 5 is connected to user device 20 (e.g., telephones or computer terminals) on the device side 25 of the telephone system 5 via an interface circuit 30.

Many components (e.g., data access arrangements (DAAs) or CODEC's) of telephone interface circuits are PSTN line-powered circuits that also require isolation from low-voltage power supplies. Because of this required isolation, line powered interface circuits will not function until they are connected to a power source, i.e., the interface circuit must be activated when it is needed to connect the line side to the device side. When a circuit on the line side is placed in the "on-hook" state (e.g., a telephone receiver is placed in its cradle) the local loop is opened and almost all of the power to the interface circuit is cut off. Activating the DAA or CODEC requires that some power must be drawn from the loop or from another source. While in the on-hook state a small amount of current (idle-state loop current) can be drawn for a short period of time from the TIP/RING line to register that an event has occurred on the PSTN TIP and RING line. However, it is extremely inefficient to draw the extra power unless it is really needed, i.e., it is extremely wasteful of time and resources to power up the DAA or CODEC when a transient noise signal occurs on the TIP and RING line.

The primary events that the interface must detect while in the on-hook state are the application of a TIP and RING signal and a polarity reversal of TIP and RING DC voltage, either of which may be used to signal the need for more power. A problem can arise because ordinary transients on the line can have electrical characteristics very similar to those of actual events. To discriminate between transients and actual events, prior art interface circuits employ the previously mentioned discrimination circuitry that determines the exact nature of every signal introduced thereto, but these additional circuits draw higher amounts of power. While drawing additional power is acceptable on a temporary basis, the amount of power available is limited. Discrimination circuits must operate at power levels no higher than the amounts determined by regulatory agencies as "satisfactory" on-hook leakage currents. Different amounts of leakage current are allowed for short periods of time. As an example, ringer AC current may be rectified and used as a source of power. Regulatory agencies allow higher leakage currents during Calling Number Delivery (Caller-ID).

In addition to determining what an event is, the event signals themselves must be transmitted from the device side to the line side. A problem arises because high voltage isolation prevents the transmission of the event signals from the device side to the line side. Prior art circuits avoid this problem by using optical couplers to transmit the signal caused by the actual event to the low voltage interface. These circuits employ a general purpose optical coupler with an LED input and a photo-transistor output. These optical couplers require "light pipes" which are cavities on the chip between the emitter and the detector of the optical coupler to allow the light to pass between the two. These light pipes increase the size and cost of the interface circuit. Capacitive coupling, another known isolation method, allows the circuit size to remain small and low cost, but the rate at which the events occur are too slow to accurately transmit them from the device side to the line side using capacitive coupling.

To avoid powering up the discrimination circuitry except when it is needed to process an actual event, it would be desirable to employ a preliminary circuit that, before invoking the discrimination circuitry, distinguishes between actual events (e.g., a ring signal, a polarity reversal, an audio signal) and noise (transient spikes on the line caused by a variety of sources, e.g., lightning, battery noise, etc.). Accordingly, there remains a need for a simplified, smaller, and less costly detection circuit that can operate on the minimal amount of power available when the circuit is in the on-hook state to preliminarily distinguish between actual and noise events, and transmit event signals between the device side and line side while maintaining electrical isolation between the device side and the line side.

SUMMARY OF THE INVENTION

These and other aspects of the invention may be obtained generally in a network interface circuit that screens out transient signals and provides an indication to the line side that an actual event has occurred, so that appropriate discrimination circuitry can be powered up to determine the exact nature of the actual event.

According to one exemplary embodiment of the present invention, an event detection apparatus is disclosed for distinguishing between the occurrence of actual events and transient events on the tip and ring lines of a phone line, comprising, a signal generator generating an output signal upon receipt of an input signal from the tip and ring line, and a signal receiver receiving the output signal from the signal generator, wherein the signal generator outputs an event-detect signal only upon receipt by the signal generator of an input signal caused by the occurrence of an actual event.

In a preferred embodiment, the signal receiver comprises a counting device for counting the number of output signals generated by the signal generator, a clear circuit for clearing the counting device after a predetermined time period, and a gate outputting the event-detect signal if the counting device counts a predetermined number of output signals within the predetermined time period.

In a more preferred embodiment, the signal generator comprises a differential comparator having inputs coupled to the tip and ring line and an output, a timer having an input coupled to the output of the differential comparator and an output, and an oscillator having a first input coupled to the output of the differential comparator and a second input coupled to the output of the timer, and having an output coupled to the signal receiver.

In still another preferred embodiment, the signal generator is capacitively coupled to the signal receiver. Further the counting device can comprise at least two binary counters operating in parallel and in alternating sequence, each binary counter having a threshold level which, when reached, causes the counter reaching the threshold level to output to the gate a signal indicating the reaching of the threshold level.

DETAILED DESCRIPTION OF THE INVENTION

Figure 1:
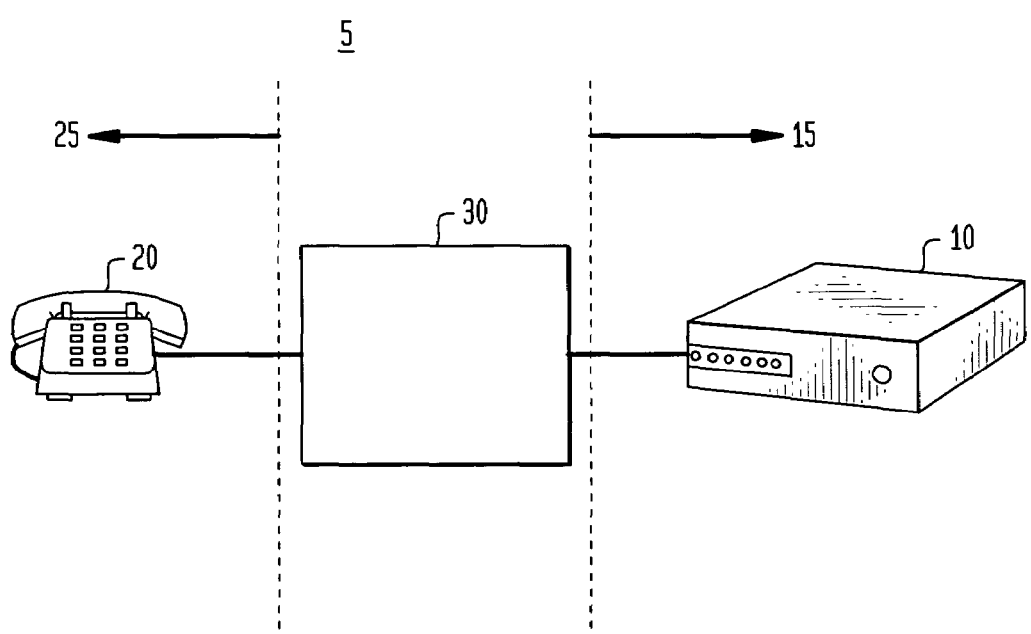
FIG. 1 is a block diagram of a typical telecommunication system illustrating an environment in which the preferred embodiment of the present invention can reside.
Figure 2:
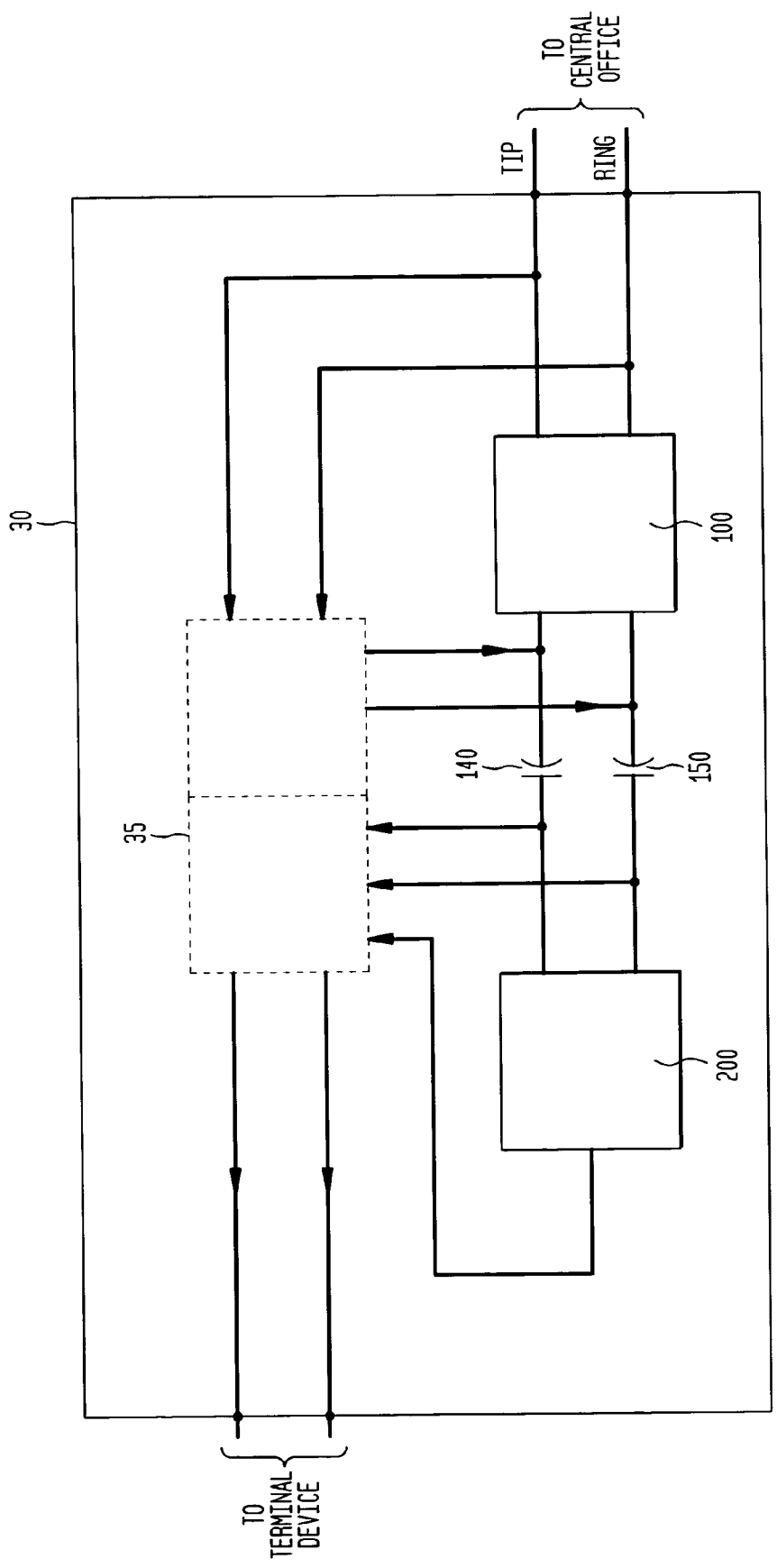
FIG. 2 is a block diagram of a network interface system in accordance with the present invention.

As described below in more detail and in accordance with an embodiment of the invention shown in FIG. 2, a network interface circuit 30 comprises a high voltage event detect generator (EDG) 100 and a low voltage event detection receiver (EDR) 200. The EDG 100 is capacitively coupled to the EDR 200 via capacitors 140 and 150, thereby isolating the EDG 100 from the EDR 200 and, therefore, isolating the line side from the device side. Although not part of the present invention, in practical application the interface circuit 30 includes additional parallel-connected processing circuitry 35 e.g., modem circuitry, a digital signal processor, and/or DAA/CODEC circuits that is also isolated via capacitors 140 and 150 as shown.

Figure 3:
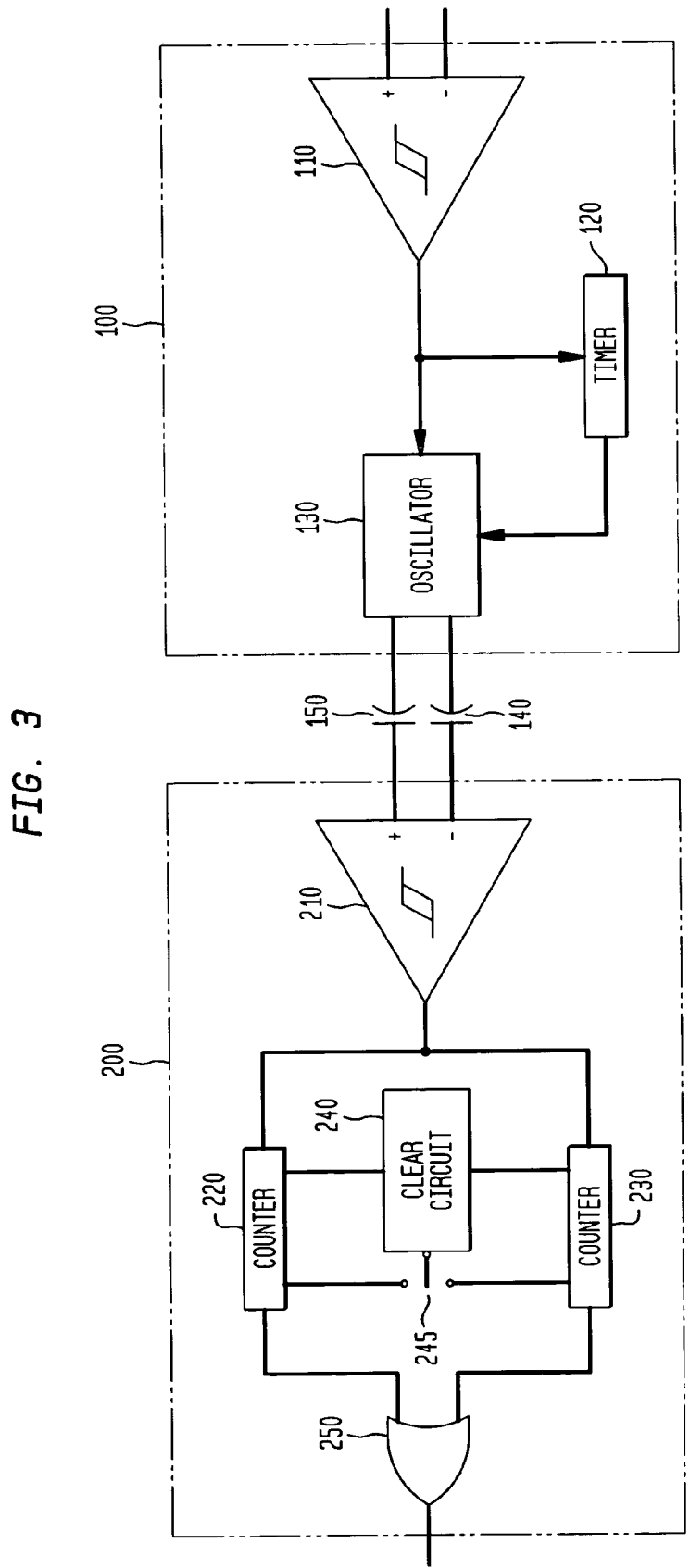
FIG. 3 is detailed block diagram of an event detection generator and event detection receiver in accordance with the present invention.

FIG. 3 is a detailed block diagram of an event detection generator and an event detection receiver in accordance with the present invention. As shown in FIG. 3, EDG 100 comprises a differential comparator 110 coupled to the TIP and RING line, a timer 120 coupled to the output of differential comparator 110, and an oscillator 130 coupled to the output of differential comparator 110 and the output of timer 120. The oscillator 130 is turned on when a signal is output from differential comparator 110, and the oscillator 130 is timed to remain on for a predetermined period of time controlled by timer 120. Oscillator 130 operates at a frequency high enough that the capacitive coupling capacitors 140 and 150 receive sufficient energy to properly transmit a signal indicating the occurrence of an event to the low voltage circuitry of EDR 200.

Whenever an initial threshold condition is met as sensed by differential comparator 110 in EDR 100, timer 120 and oscillator 130 are triggered, causing oscillator 130 to operate for the time period specified by timer 120. The output of oscillator 130 is directed across the differential interface comprising capacitors 140 and 150 to EDR 200. As discussed in more detail below, the output of oscillator 130 sends an AC signal across capacitors 140 and 150 that is unlike any transient that would occur on the line, in the form of a high-frequency sustained burst.

In the preferred embodiment, comparator 110 is a hysteresis comparator. If a particular signal is below a minimum differential current level, e.g., 100 $\mu$A AC peak-to-peak, the chance of the signal being a useable valid event is very low. Thus, it would be preferable to ignore such minimum signals. Therefore, the hysteresis is designed into the differential comparator 110 to produce a "dead band" below which the network interface circuit 30 will not respond.

EDR 200 comprises a differential comparator 210, counters 220 and 230 coupled to the output of comparator 210, a clear circuit 240 switchably connectable between counter 220 and counter 230 via switch 245, and OR gate 250 coupled to the outputs of counters 220 and 230. Output counters 220 and 230 have an overflow output such that they output a digital signal when they reach capacity. Since events may occur at any time with respect to the sampling by the active counter, two parallel circuits are employed in EDR 200 so that one counter may be cleared by clear circuit 240 while the other counter continues to register the event. Thus, via switch 245, clear circuit 240 alternately clears counter 220 and counter 230 so that an event in the process of being counted is not lost.

By way of example and without limitation, in the preferred embodiment timer 120 is a 1 millisecond timer and oscillator 130 is a low power, 1 MHz oscillator. To reduce costs, the oscillator 130 can have process dependant variation such as a ring oscillator and should drive timer 120. By driving the timer 120 with the oscillator 130, if there is a variation in the 1 MHz oscillator signal, the period of timer 120 will be reduced when the oscillator frequency increases and will increase when the oscillator frequency decreases. For example, if the oscillator 130 is variable between 1 and 3 MHz, timer 120 will operate between 1 mS and 330 microseconds, depending on (and controlled by) the frequency of the oscillator 130. The low voltage circuitry of EDR 200 can be built to match these variations in terms of monitoring the event; This arrangement allows the use of a less-costly oscillator that does not require trimming.

In this example, if the oscillator 130 is controlled by timer 120 to remain active for 1 mS and the frequency of the oscillator 130 is 1 Mhz, and the capacitors 140 and 150 are 5 picoFarad capacitors, then 1000 pulses will be output to capacitors 140 and 150 when a signal is output from the differential comparator.

Since, in this example, 1,000 transients must occur within the 1 millisecond cycle of the timer 120 before EDR 200 will output an indication that an actual event has occurred, it is virtually impossible for EDR 200 to respond to anything other than an actual event. If the EDR 200 receives less than 1,000 transients within the period of clear circuit 240, the active counter in EDR 200 is cleared and a new count begins. An actual event will appear on the counter as a 1 millisecond burst of oscillator 130, or in other words, greater than 1000 transients within the period of clear circuit 240 will occur, and this would be registered as an actual event.

In a preferred embodiment, Counters 220 and 230 are conventional binary counters with an overflow output so that they will output a digital signal when they reach capacity. As mentioned above, dual counters 220 and 230 are employed to assure that there is constant monitoring of the line. For example, in the example set forth above, a 1 mS timer is utilized. If half-way through the occurrence of an event (e.g., 0.5 mS into the event) the clear circuit 240 operates to clear counter 220, secondary counter 230, operating in parallel with counter 220, will properly register the event.

In the preferred embodiment, EDR 200 is designed for low power operation, e.g., it uses static CMOS circuitry operating at low frequencies, thereby drawing very little current. For example, EDR 200 may be operating off the battery power of a lap top computer and must be able to operate on the power provided by the lap top computer when it is operating in the "battery saver" or "sleep" mode.

The present invention develops an AC signal that represents the events that are desired to be detected. This AC signal is timed so that it has a sustained rate (e.g., a 1 millisecond burst) that is unlike any transient that would occur on the line. Thus, unless the incoming signal meets the timing requirements of the circuit, it is disregarded as being a transient and no action is taken to determine the exact nature of the signal. This avoids the need to invoke the discrimination circuits that have large power requirements until they are actually needed.

Thus, the present invention acts as a fast-acting screening device, e.g., a "first line of defense" for determining what has occurred on a TIP and RING signal. It operates on idle-state loop current and allows the determination to be made that there is an event that requires further investigation before powering up additional circuitry to identify precisely what kind of event it is. When it is known that an actual event has occurred, it is acceptable to draw more current to determine exactly what it is.

The events that would be considered valid on TIP and RING lines are those that are considered differential in nature. A differential event involves a current that flows from TIP to RING as opposed to a current that flows from TIP to system ground or RING to system ground. A current that flows to system ground is called a longitudinal or common-mode current. The present invention is designed to be sensitive to differential currents and insensitive to longitudinal or common-mode currents.

Figure 4:
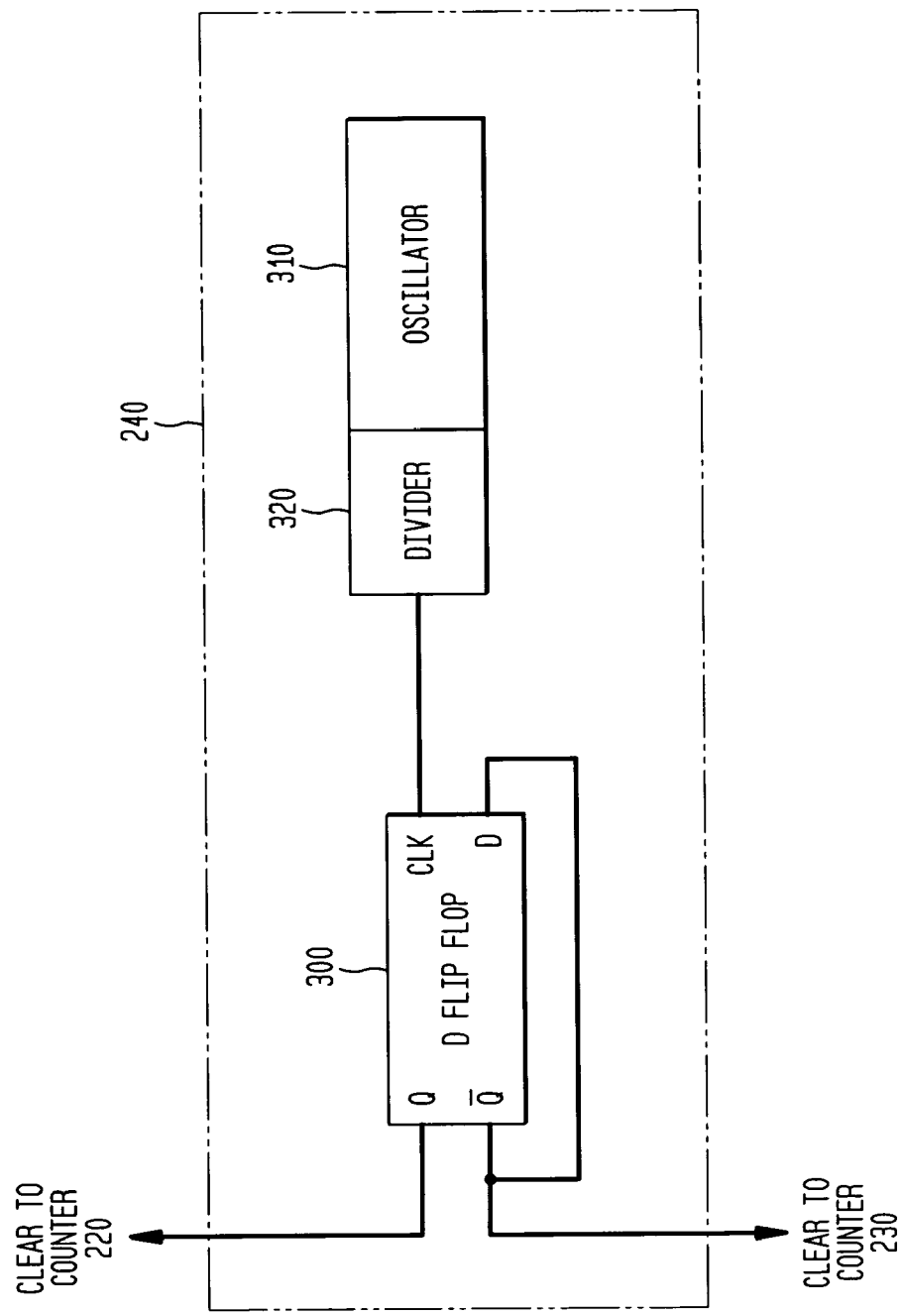
FIG. 4 is a detailed block diagram of an embodiment of a clear circuit in accordance with the present invention.

FIG. 4 illustrates an example of a clear circuit 240 in accordance with the present invention. Obviously, clear circuit 240 can be configured in many different forms and the example shown in FIG. 4 should not be considered as limiting. Referring to FIG. 4, a D flip-flop 300 has a Q output connected to counter 220 and a Q_ output coupled to counter 230. A clock signal is input to D flip-flop 300 from divider 320. Divider 320 is driven by oscillator 310. Oscillator 310 with divider 320 operates to produce a clear function 240 that insures that events will be properly registered even for the wide variation in oscillator 130. The D input of the D flip-flop 330 is coupled to the Q_ output of D flip-flop 300. In this configuration, with every positive clock pulse from oscillator 310, the D flip-flop circuit 300 will clear counter 220, and with every negative clock pulse from oscillator 310, D flip-flop 300 will clear counter 230. Thus, if a 3 millisecond period was desired for each counter 220 and 230, oscillator 310 should be a 660 Hz oscillator. This would result in the 3 millisecond period for the counters as discussed.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. An event detection apparatus for distinguishing between the occurrence of actual events and transient events on the tip and ring lines of a phone line, comprising:
    a signal generator generating an output signal upon receipt of an input signal from said tip and ring line; and
    a signal receiver receiving the output signal from said signal generator, wherein said signal receiver outputs an event-detect signal upon receipt of an output signal from said signal generator caused by the occurrence of an actual event, and wherein said signal receiver comprises:
        a counting device for counting the number of said output signals generated by said signal generator;
        a clear circuit for clearing said counting device after a predetermined time period; and
        a gate outputting said event-detect signal if said counter counts a predetermined number of said output signals within said predetermined time period.

2. An apparatus as set forth in claim 1 wherein said signal generator comprises:
    a differential comparator having inputs coupled to said tip and ring line and an output;
    a timer having an input coupled to the output of said differential comparator and an output; and
    an oscillator having a first input coupled to the output of said differential comparator and a second input coupled to the output of said timer, and having an output coupled to said signal receiver.

3. An apparatus as set forth in claim 2 wherein said signal generator is capacitively coupled to said signal receiver.

4. An apparatus as set forth in claim 1, wherein said counting device comprises at least two binary counters operating in parallel and in alternating sequence, each binary counter having a threshold level which, when reached, causes said counter to output to said gate a signal indicating the reaching of said threshold level.

5. An apparatus as set forth in claim 4, wherein said clear circuit comprises switching means for alternately clearing said binary counters after each occurrence of said predetermined time period.

6. An apparatus as set forth in claim 4, wherein said counting device comprises first and second binary counters and wherein said clear circuit comprises:
    a D flip-flop having a Q output coupled to said first binary counter and a Q_ output coupled to said second binary counter; and an oscillator and divider coupled to said D flip-flop to alternately provide a positive clock pulse and a negative clock pulse to said D flip-flop so that on each positive clock pulse, said D flip-flop clears said first binary counter and on each negative clock pulse said D flip-flop clears said second binary counter.

7. An integrated circuit including an event detection apparatus for distinguishing between the occurrence of actual events and transient events on the tip and ring lines of a phone line, comprising:

a signal generator generating an output signal upon receipt of an input signal from said tip and ring line; and a signal receiver receiving the output signal from said signal generator, wherein said signal receiver outputs an event-detect signal upon receipt an output signal from said signal generator caused by the occurrence of an actual event, and wherein said signal receiver comprises:

a counting device for counting the number of said output signals generated by said signal generator;

a clear circuit for clearing said counting device after a predetermined time period; and a gate outputting said event-detect signal if said counter counts a predetermined number of said output signals within said predetermined time period.

8. An integrated circuit as set forth in claim 7 wherein said signal generator comprises:

a differential comparator having inputs coupled to said tip and ring line and an output;

a timer having an input coupled to the output of said differential comparator and an output; and an oscillator having a first input coupled to the output of said differential comparator and a second input coupled to the output of said timer, and having an output coupled to said signal receiver.

9. An integrated circuit as set forth in claim 8 wherein said signal generator is capacitively coupled to said signal receiver.

10. An integrated circuit as set forth in claim 7, wherein said counting device comprises at least two binary counters operating in parallel and in alternating sequence, each binary counter having a threshold level which, when reached, causes said counter to output to said gate a signal indicating the reaching of said threshold level.

11. An integrated circuit as set forth in claim 10, wherein said clear circuit comprises switching means for alternately clearing said binary counters after each occurrence of said predetermined time period.

12. An integrated circuit as set forth in claim 10, wherein said counting device comprises first and second binary counters and wherein said clear circuit comprises:

a D flip-flop having a Q output coupled to said first binary counter and a Q_ output coupled to said second binary counter; and an oscillator and divider coupled to said D flip-flop to alternately provide a positive clock pulse and a negative clock pulse to said D flip-flop so that on each positive clock pulse, said D flip-flop clears said first binary counter and on each negative clock pulse said D flip-flop clears said second binary counter.

13. A method of distinguishing between the occurrence of actual events and transient events on the tip and ring lines of a phone line, comprising the steps of:

generating an output signal upon receipt of an input signal from said tip and ring line;

counting the number of said output signals;

clearing said count after a predetermined time period; and outputting an event-detect signal if a predetermined number of said output signals are counted within said predetermined time period.

* * * * *